Feb. 7, 1956  W. F. KEARNEY  2,733,565
LAWN MOWER
Filed May 19, 1953
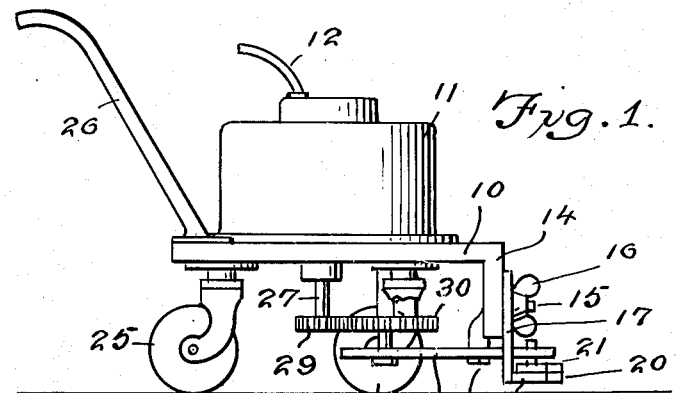
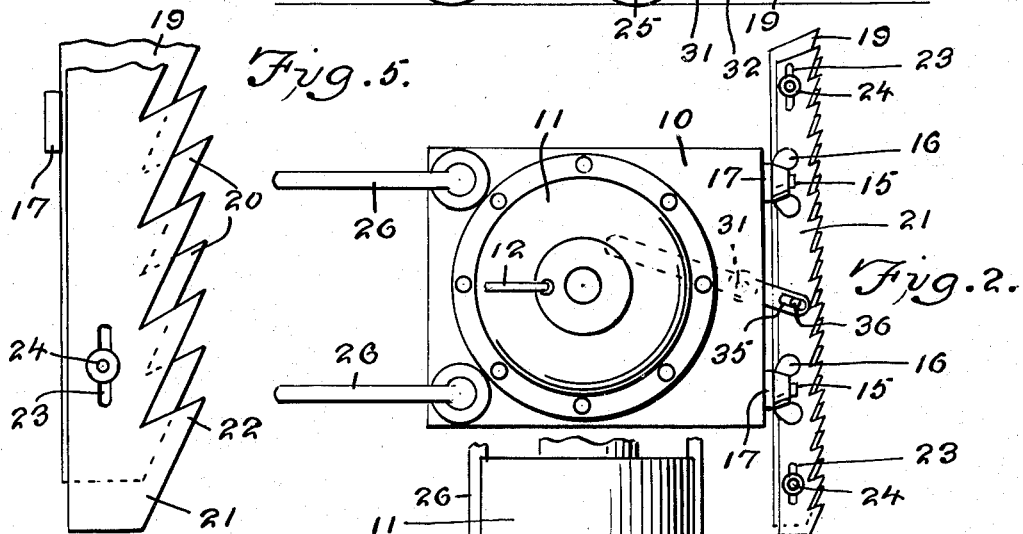
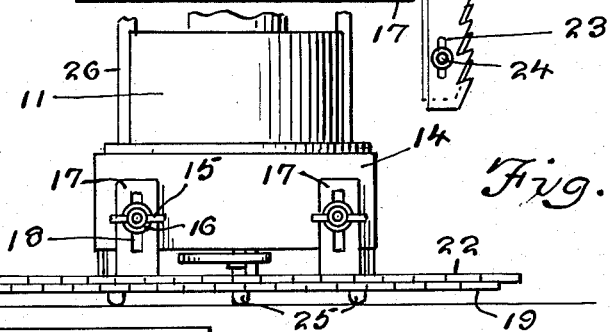
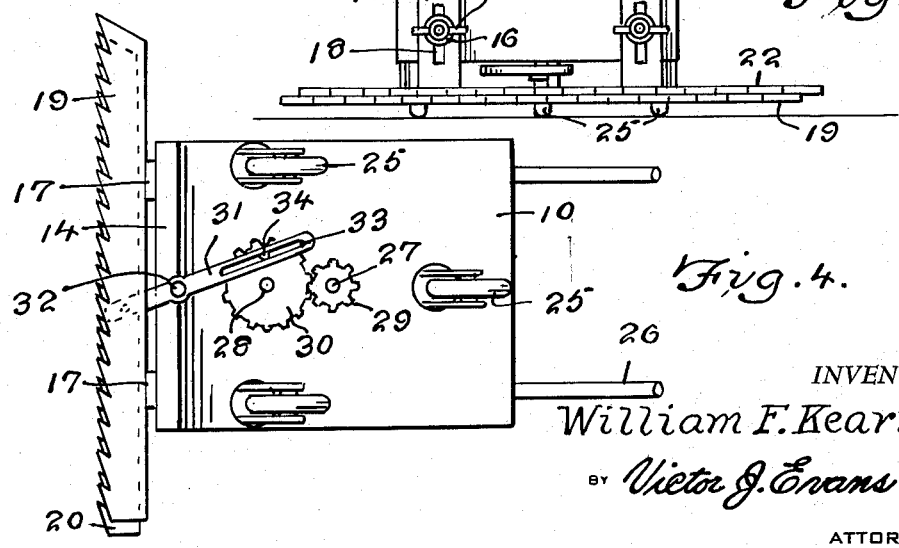
INVENTOR.
William F. Kearney
BY Victor J. Evans & Co.
ATTORNEYS

United States Patent Office 2,733,565
Patented Feb. 7, 1956

2,733,565

LAWN MOWER

William F. Kearney, New Orleans, La.

Application May 19, 1953, Serial No. 355,930

1 Claim. (Cl. 56—26.5)

This invention relates to a lawn mower, and more particularly to a power driven lawn mower.

The object of the invention is to provide a lawn mower which will efficiently cut grass and the like with a horizontal reciprocating motion.

Another object of the invention is to provide a lawn mower which will enable the user to mow or cut grass close to houses, fences, trees and the like, the lawn mower including a movable platform having a motor counted thereon and a sickle bar arranged forwardly of the platform.

A further object of the invention is to provide a lawn mower which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the lawn mower, constructed according to the present invention.

Figure 2 is a top plan view of the lawn mower.

Figure 3 is a front elevational view of the lawn mower.

Figure 4 is a bottom plan view of the lawn mower.

Figure 5 is an enlarged fragmentary top plan view of the sickle bar.

Referring in detail to the drawings, the numeral 10 designates a horizontally disposed platform, and mounted on the platform 10 and secured thereto is a motor or engine 11. The motor 11 may be connected to a suitable source of electrical energy by means of a flexible cord 12, but it is also to be understood that the motor 11 may be of the conventional gasoline driven type.

Depending from the front end of the platform 10 and secured thereto is a vertically disposed plate 14, and extending forwardly from the plate 14 is a pair of securing elements or screws 15. A wing nut 16 is arranged in threaded engagement with each of the bolts 15.

Arranged contiguous to the front surface of the plate 14 is a pair of vertically disposed vertically adjustable arms 17, and each of the arms 17 is provided with an elongated slot 18 for receiving therein the bolts 15. Thus, by loosening the wing nut 16 the arms 17 can be moved up and down on the bolts 15 so that the height at which the grass is cut can be adjusted as desired.

Secured to the lower ends of the pair of arms 17 is a stationary blade 19 which is provided with a plurality of inclined pointed sharp teeth 20. Movably or slidably mounted on top of the stationary blade 19 is a horizontally reciprocating cutter bar 21 which is provided with a plurality of inclined teeth 22 that are adapted to coact with the teeth 20 to sever the grass therebetween. The sliding bar 21 is also provided with a pair of spaced slots 23 through which project pins 24 that extend upwardly from the blade 19, the slots 23 and pins 24 providing a guide means for the sliding bar 21.

For supporting the platform 10, a plurality of ground engaging caster wheels 25 are provided. Extending rearwardly and upwardly from the platform 10 and secured thereto is a pair of handles 26 which are adapted to be gripped in the user's hands so that the lawn mower can be guided or directed to wherever the grass is to be cut.

A means is provided for connecting the movable bar 21 to the motor 11 so that when the motor 11 is actuated, the bar 21 will be reciprocated to cut the grass. This means comprises a drive shaft 27 which depends from the motor 11 and is connected thereto, and the drive shaft 27 has mounted thereon a gear wheel 29 which meshes with a gear wheel 30 that is mounted on a driven shaft 28. A lever 31 is pivotally connected to the platform 10 by a pin 32, and the lever 31 is provided with a slot 33 for receiving an eccentric pin 34 that is mounted on the gear wheel 30. The front end of the lever 31, Figures 2 and 4, is provided with a slot 35, and extending through the slot 35 in a pin 36 that is connected to the movable cutter bar 21.

From the foregoing it is apparent that a power driven lawn mower has been provided wherein the movable cutter bar 21 is operated by an electric or gasoline driven engine 11. As the motor 11 drives the shaft 28, the gear 29 meshes with the gear 30 to cause the lever 31 to pivot and this pivotal movement of the lever 31 causes sliding movement of the cutter bar 21 on the stationary blade 19. The coacting teeth on these members sever the grass therebetween. The user can grip the handles 26 to move the lawn mower readily from side to side or back and forth. The lawn mower will permit a person to mow or cut grass close to houses, fences, trees, and the like. The sickle bar including the movable cutter bar 21 and stationary blade 19 can be raised or lowered by loosening the thumb nuts 16 so that different heights of cuts can be affected. The caster wheels 25 are arranged so that the platform will be properly balanced and the cutting action takes place even though the lawn mower is moving backwards, forward, or from side to side. The teeth 20 on the blade 19 holds the grass in cutting position so that the teeth 22 on the sliding bar 21 will sever the grass. The ends of the sickle bar extend beyond the sides of the platform 10 so that the mower can be used for cutting between shrubs and bushes and up close to trees that may have uneven trunks at ground level. With the present invention, the caster wheels 25 do not roll on uncut grass and the sickle bar can be adjusted to permit trimming of grass at edges of walks and the like.

Preferably the platform on which the motor or gas engine rests is as small as possible and is only large enough to hold the motor or engine. Further, it is to be noted that the teeth of the cutter bars are arranged at an angle which is different from the teeth used generally on regular hay mowers.

The slanted teeth or arrangement of the teeth at an angle serves to hold the grass in position for the top cutter bar and this action would take place while the top cutter bar is moving either from the left to the right or from the right to the left. With proper construction, and with the teeth properly fitted together, the cutting action of the mower would give a clean neat cut and the grass will not slide through such a properly fitted cutting action. For example, when scissors or shears are properly constructed or fitted together, they will cut the thinnest kind of silk thread but when scissors or shears are poorly constructed and ill fitted, dress or suit materials will slide through the scissors without being cut. Also, the cutting teeth on the present mower come closer together near the back end and this enables the top cutter bar to catch all blades of grass while the top cutter bar is moving forward and backward. The slanted teeth on the mower, that is the bottom or stationary portion thereof, serve in the same manner as the cutter bar on a reel type mower.

I claim:

In a lawn mower, a horizontally disposed platform, a motor mounted on said platform and secured thereto, a vertically disposed plate depending from the front end of said platform, a pair of securing elements extending forwardly from said platform, a pair of vertically disposed arms each provided with a slot for adjustably receiving said securing elements, a sickle bar including a stationary horizontally disposed blade arranged forwardly of said arms and secured to the lower ends thereof and said blade being provided with a plurality of inclined teeth, a pair of pins extending upwardly from said blade, a movable cutter bar having a plurality of inclined teeth thereon slidably mounted on said blade and provided with a pair of spaced apart slots for receiving said pins, said blade and bar having their ends extending beyond said platform, a pair of handles extending rearwardly and upwardly from said platform, caster wheels for supporting said platform, and means connecting said cutter bar to said motor, said means comprising a vertically disposed drive shaft extending downwardly from said motor, a first gear mounted on the lower end of said drive shaft, a vertically disposed driven shaft arranged in spaced parallel relation with respect to said drive shaft, a second gear connected to said driven shaft and meshing with said first gear, a lever pivotally connected to said platform, said lever having a slot in each end thereof, an eccentric pin extending through the slot in the rear of said lever and connected to said second gear, a pin member extending through the slot in the front of said lever and connected to said movable bar, the inclined teeth on said blade and bar being slanted in the same direction at an acute angle with respect to the longitudinal axis of said blade and bar.

References Cited in the file of this patent

UNITED STATES PATENTS

| | | |
|---|---|---|
| 1,567,055 | Huff | Dec. 29, 1925 |
| 1,603,637 | Ott | Oct. 19, 1926 |
| 1,829,690 | Turner | Oct. 27, 1931 |